Sept. 21, 1971 B. E. SHIPP 3,606,877
SMOKELESS MOBILE FIELD BURNER INCINERATOR
Filed Oct. 13, 1969 2 Sheets-Sheet 2

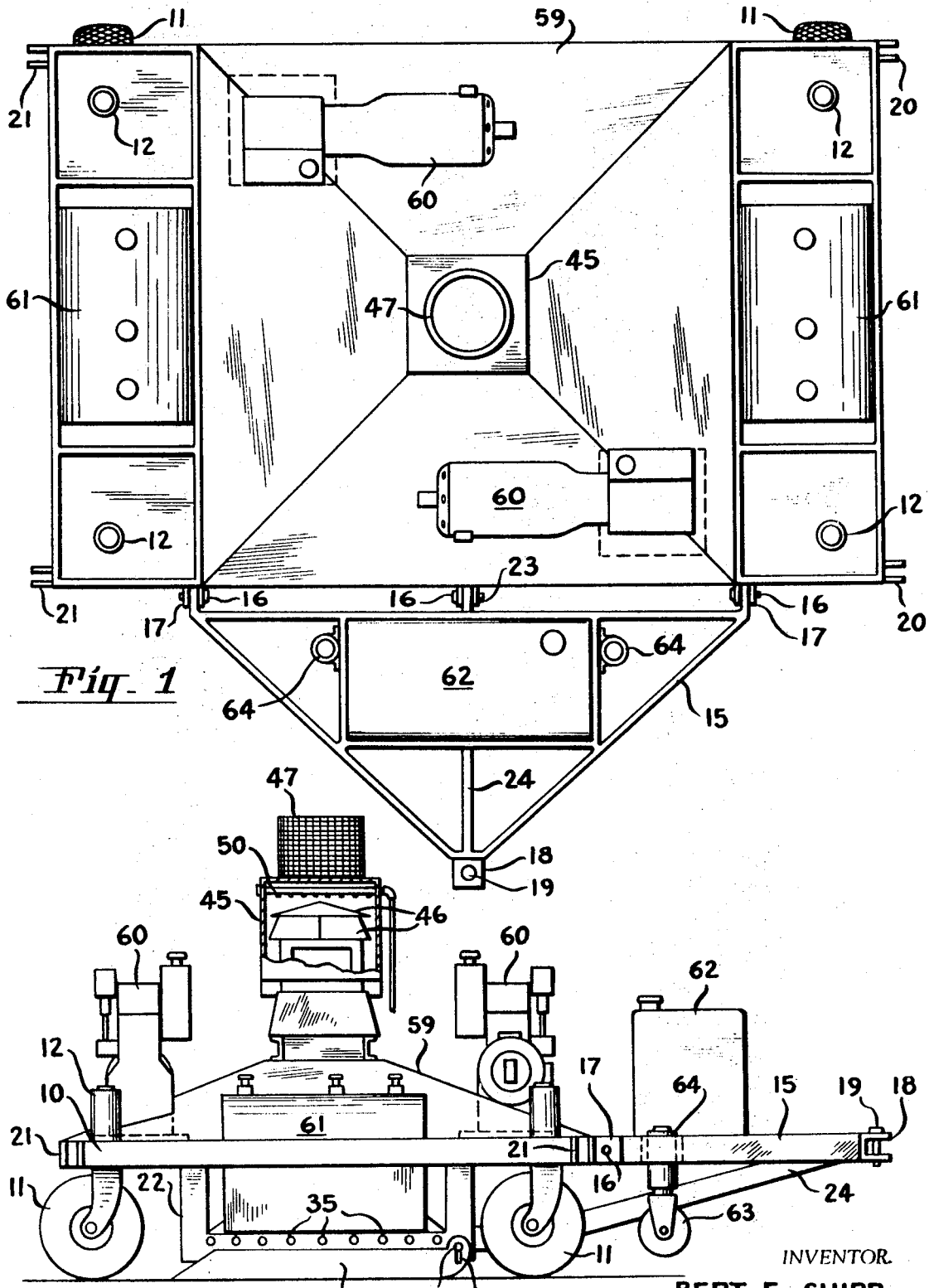

INVENTOR.
BERT E. SHIPP
BY
Attorney

United States Patent Office 3,606,877
Patented Sept. 21, 1971

3,606,877
SMOKELESS MOBILE FIELD BURNER
INCINERATOR
Bert E. Shipp, 2311 SW. Iron Mountain Blvd.,
Lake Oswego, Oreg. 97034
Filed Oct. 13, 1969, Ser. No. 865,606
Int. Cl. A01m 1/20, 15/00
U.S. Cl. 126—271.2A                                    10 Claims

ABSTRACT OF THE DISCLOSURE

A vehicle on caster wheels has a hood a short distance above the ground equipped with oil burners forming a primary combustion chamber to consume all burnable material on the ground. A secondary combustion chamber burns and eliminates the smoke from the primary combustion chamber and a water spray scrubber removes cinders and fly ash so that only relatively clear combustion gases are discharged into the atmosphere. The vehicle is of a width appropriate for travel on a public road and is equipped with a drawbar which may be shifted to one side of the vehicle so that in use it is drawn sideways across a field to burn a wide swath equal to the length of the vehicle.

BACKGROUND OF THE INVENTION

This invention relates to a smokeless mobile field burner incinerator.

In the growing of certain crops, farmers find it necessary to burn the fields in the fall, not only to remove stubble, grass and weeds but also to destroy insects which are harmful to the crops, including their eggs and larvae which would otherwise lie dormant over the winter and attack the crop during the next growing season. The resulting clouds of dense smoke have become extremely objectionable to nearby communities and have created traffic hazards from loss of visibility along adjacent high speed highways.

Stubble burners have been proposed heretofore which are more effective in burning stubble and weeds and in destroying insects than open field burning, but such machines have created substantially as much air pollution as open field burning.

Objects of the invention are, therefore, to provide an improved mobile field burner, to provide a field burner which is highly efficient in destroying stubble, grass, weeds and insects, to provide a field burner which is smokeless in operation, to provide a field burner having a secondary combustion chamber which is effective to burn and eliminate all smoke produced in the primary combustion of the stubble, grass and weeds, to provide a field burner of a size adapted to burn off a relatively wide swath and which is also adapted for travel on public roads, and to provide a field burner of the type described which is of relatively simple and inexpensive construction.

SUMMARY OF THE INVENTION

The present machine has a hood forming a primary combustion chamber close to the ground. This primary combustion chamber is equipped with burners supplied by oil or other suitable fuel capable of developing an intense heat under the hood and directed toward the ground. This intense heat burns everything combustible in its path and completes the combustion before the machine has left the burning area so that no smoldering fire is left to produce smoke and air pollution behind the machine.

The burning which takes place in the primary combustion chamber produces a large volume of dense smoke. This smoke is entirely burned and consumed in a secondary combustion chamber and cinders and fly ash are removed by a water spray scrubber so that only relatively clean combustion gases are discharged into the atmosphere. Auxiliary means are provided to prevent spreading of the fire in an uncontrolled manner which would contaminate the atmosphere.

Although the machine may include its own motive power, the preferred embodiment herein illustrated is equipped with a drawbar for towing behind a tractor or truck. The machine is of suitable width for roadway travel with the drawbar attached to one end of the machine. In order to burn as wide a swath as possible across a field, the machine is towed sideways in use. For this purpose the drawbar is removed from the end and attached to one side of the machine. The machine is mounted on caster wheels which permit it to travel either lengthwise or sideways.

The invention will be better understood and additional objects and advantages will become apparent from the following description of the preferred embodiment illustrated in the accompanying drawings. Various changes may be made in the details of construction and arrangement of parts and certain features may be used without others. All such modifications are included in the invention.

BRIEF DESCRIPTION OF THE DRAWINGS

FIG. 1 is a top plan view of a field burner embodying the principles of the invention;
FIG. 2 is a side elevation view with parts broken away.

Figure 4:
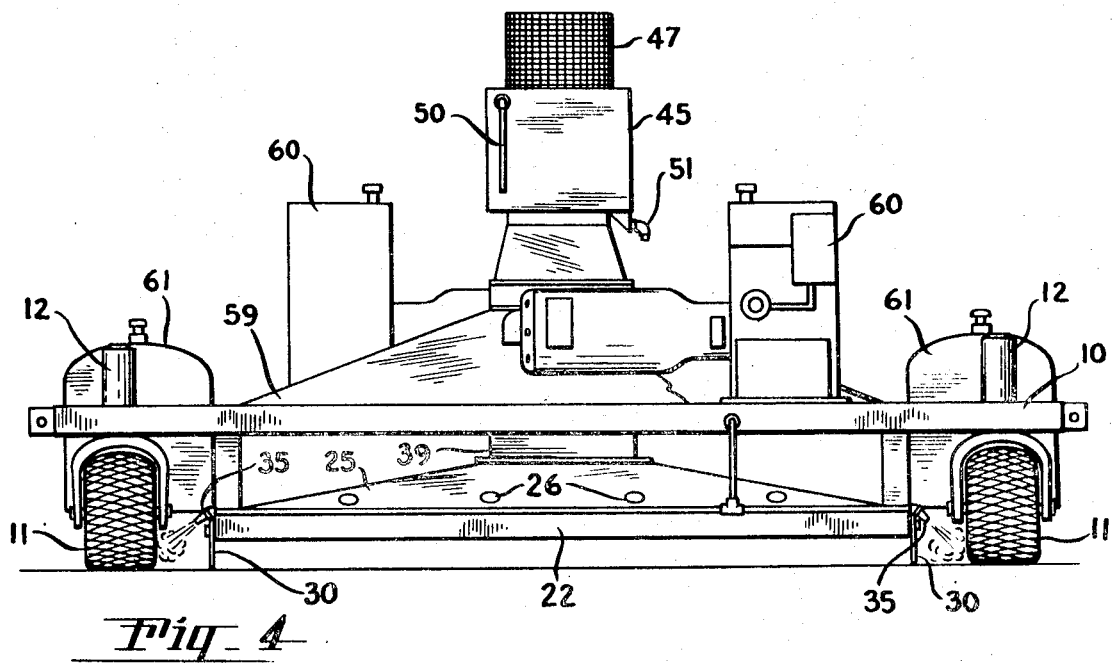
FIG. 4 is a rear elevation view.
Figure 3:
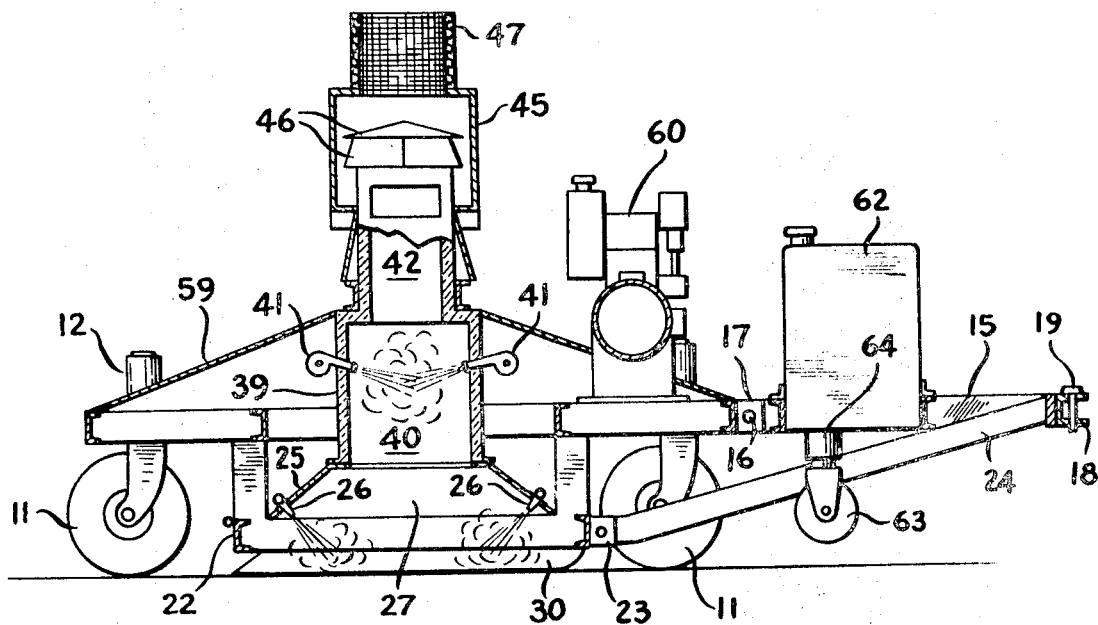
FIG. 3 is a sectional view.

DESCRIPTION OF THE PREFERRED
EMBODIMENT

The machine has a rectangular frame 10 supported on four caster wheels 11. Each wheel is mounted on a piston to swivel in a vertical hydraulic cylinder 12 on one corner of frame 10. In use, a drawbar 15 is connected by pins 16 with ears 17 on one of the longer sides of the frame as shown in FIG. 1 to pull the frame sideways as a trailer vehicle across a field to be burned. The front end of the drawbar has a bracket 18 to receive a pin 19 for pivotal connection with a towing vehicle.

The two short sides of frame 10 are equipped with similar apertured ears 20 and 21 to connect the drawbar for lengthwise travel as a trailer on a road or highway, the short side of the frame being of suitable width for such use. In both sideways and lengthwise travel the front wheels 11 are allowed to swivel freely in their vertical cylinders 12 and the trailing wheel swivels are locked by suitable pins or pawls. Frame 10 has an underhanging portion 22 equipped with apertured ears 23 to receive a pin in the lower end of a drawbar brace 24.

A hood 25 is supported a short distance above the ground by underhanging portion 22 of frame 10. This hood is equipped with a plurality of burner nozzles 26 arranged to direct intense flames downward toward the ground under the hood. Thus, the hood 25 and burner nozzles 26 define a primary combustion chamber 27 for burning everything combustible on the ground, such as stubble, grass, weeds, twigs, etc.

A pair of floating slicer bars 30 is pivotally mounted on opposite sides of hood 25. Each slicer bar has a vertical slot 31 in its leading end which receives a horizontal pin 32 in the frame part 22. As the vehicle moves over irregular ground, the slicer bar 30 slides on the ground surface with the front end moving up and down on pin 32 and the trailing end pivoting on the pin.

The two slicer bars 30 prevent the fire from spreading laterally away from hood 25 and also restrict the inlet of air for combustion to the front and rear sides of the hood. Lower frame part 22 also carries water spray nozzles 35 directed downwardly toward the ground immediately outside of each slicer bar 30 as shown in FIGS. 2 and 4. Any sparks or flame that may escape or spread under the slicer bars are quenched by these sprays.

A vertical housing 39 connected with the open upper end of hood 25 forms a mixing and secondary combustion chamber 40 receiving the smoke and combustion gases from primary combustion chamber 27. Secondary combustion chamber 40 is equipped with a plurality of fuel burner nozzles 41 which produce a sufficiently high temperature in chamber 40 to burn all the smoke therein.

The combustion gases from chamber 40 pass upward by natural draft through a stack 42 which terminates in a scrubber chamber 45. Deflector plates 46 deflect the rising gases outward and downward around the periphery of the upper end of stack 42, the gases then turning upward and leaving the top of chember 45 through spark arrester screen 47. During passage through scrubber chamber 45 the gases are washed by sprays from nozzles in a water pipe 50. These sprays wash out any solids in the combustion gases which might produce dirty residue or fly ash, and the water and solids are discharged through drain 51 in the bottom of the scrubber chamber. Screen 47 is merely an added precaution for the sake of safety, as normally any burning material not consumed in secondary combustion chamber 40 would be extinguished and cooled by the water sprays in the scrubber 45.

The combustion chambers are preferably housed under a steel cover 59 and the machine is equipped with gasoline engine driven electric power plants 60 to supply power for electric water pumps, hydraulic system pumps and fuel pumps, and blowers when oil is used. Fuel is carried in tanks 61 on opposite sides of the frame and the drawbar 15 carries a water tank 62 to supply the water sprays at 35 and 50.

The drawbar 15 is equipped with a pair of auxiliary wheels 63 on pistons in hydraulic cylinders 64 to support the drawbar and tank 62 while the drawbar is being shifted back and forth between its side and end connections with the frame at 17, 20 and 21. These auxiliary wheels are normally retracted as shown when the drawbar is connected to frame 10. Slicer bars 30 are removed for lengthwise travel on a road.

In order to fill water tank 62 from time to time, the wheels 63 are lowered by cylinders 64 and drawbar 15 is detached from frame 10. Then drawbar 15 and tank 62 may be pulled as a trailer to a water supply for filling the tank.

Although hood 25 is spaced a short distance above the ground, no smoke escapes to the atmosphere through this space. As previously mentioned, the space between hood 25 and the ground is closed on opposite sides of the hood by slicer bars 30. The heat in the primary and secondary combustion chambers produces a strong upward draft through stack 42 and scrubber 45, drawing strong currents of air under the front and rear edges of hood 25. The inrushing air prevents escape of any smoke under the lower edge of the hood.

The speed of the vehicle is controlled in accordance with the nature of the material to be burned. The vehicle is moved at such a rate that all combustible material is entirely burned under the hood 25 and no burning embers remain after the hood has passed over. By the controlling of burning in this manner, the whole operation is virtually smokeless and fields may be burned without creating an air pollution problem.

In view of the low ground clearance of hood 25, the frame 10 and hood 25 are raised by cylinders 12 to pass over boulders and other obstructions on the ground. These cylinders are controlled by an electric switch in the towing vehicle through circuit wires connected with solenoid valves in the hydraulic system on the trailer vehicle.

Having now described my invention and in what manner the same may be used, what I claim as new and desire to protect by Letters Patent is:

1. A mobile field burner comprising a vehicle mounted on swiveling caster wheels, a hood mounted on said vehicle a short distance above ground level defining a primary combustion chamber, fuel burner nozzles under said hood, a secondary combustion chamber receiving the smoke and products of combustion from said primary combustion chamber, fuel burner nozzles in said secondary combustion chamber for burning said smoke, and a stack receiving the gases and products of combustion from said secondary combustion chamber for discharge into the atmosphere, said vehicle having two long sides and two short sides, and a drawbar attachable selectively to one of said short sides or one of said long sides for lengthwise travel on a road or sideways travel on a field.

2. A field burner as defined in claim 1, said two combustion chambers and stack being arranged one above the other to operate by natural draft.

3. A field burner as defined in claim 1 including a water spray scrubber receiving said gases and products of combustion from said secondary combustion chamber.

4. A mobile field burner comprising an elongated trailer vehicle, wheels supporting said vehicle for lengthwise travel on a road or sideways travel in burning a field, a drawbar attachable selectively to an end or side of the vehicle for said lengthwise and sideways travel, a hood mounted on said vehicle a short distance above ground level defining a primary combustion chamber, fuel burner nozzles under said hood for burning combustible material on the ground, a pair of slicer bars extending transversely of the length of the vehicle and arranged to slide on the ground on opposite sides of said hood when the vehicle is moving sideways, a secondary combustion chamber receiving the smoke and products of combustion from said primary combustion chamber, and fuel burner nozzles in said secondary combustion chamber for burning said smoke.

5. A field burner as defined in claim 4 including a tank mounted on said drawbar, and retractable wheels supporting said drawbar as a trailer when said drawbar is disconnected from said vehicle.

6. A mobile field burner comprising an elongated vehicle, swiveling caster wheels supporting said vehicle for lengthwise travel on a road or sideways travel in burning a field, the trailing wheels in either lengthwise or sideways travel having lockable swivels, a hood mounted on said vehicle a short distance above ground level defining a primary combustion chamber, fuel burner nozzles under said hood for burning combustible material on the ground, a pair of slicer bars extending transversely of the length of the vehicle and arranged to slide on the ground on opposite sides of said hood when the vehicle is moving sideways, a secondary combustion chamber receiving the smoke and products of combustion from said primary combustion chamber, and fuel burner nozzles in said secondary combustion chamber for burning said smoke.

7. A field burner as defined in claim 6 including means for removing fly ash and other solid particles from the combustion gases.

8. A field burner as defined in claim 7, said means comprising a water spray scrubber.

9. A field burner as defined in claim 6 including means to raise the vehicle on its wheels to permit said hood to pass over an obstruction on the ground.

10. A field burner as defined in claim 6, said swivels comprising hydraulic cylinders for raising and lowering the vehicle.

References Cited

UNITED STATES PATENTS

| | | | |
|---|---|---|---|
| 633,691 | 9/1899 | Garvey | 126—271.2A |
| 840,517 | 1/1907 | Rickard | 126—271.2A |
| 1,458,070 | 6/1923 | Long et al. | 126—271.2AX |
| 1,899,704 | 2/1933 | Lutz | 126—271.2A |
| 3,259,122 | 7/1966 | Lenker | 126—271.2A |
| 3,307,507 | 3/1967 | Boyd et al. | 110—8A |

FOREIGN PATENTS

| | | | |
|---|---|---|---|
| 978,382 | 12/1964 | Great Britain | 126—271.2A |

CHARLES J. MYHRE, Primary Examiner

U.S. Cl. X.R.

110—8A